(12) United States Patent
Prosser et al.

(10) Patent No.: US 9,306,396 B2
(45) Date of Patent: Apr. 5, 2016

(54) UTILITY DISTRIBUTION CONTROL SYSTEM

(75) Inventors: Ronald D. Prosser, Huntington Beach, CA (US); Victor Shao, Mountain View, CA (US); A. Arthur Kressner, Westfield, NJ (US)

(73) Assignees: Green Charge Networks LLC, Santa Clara, CA (US); Consolidated Edison of New York, Inc., New York, NY (US)

( * ) Notice: Subject to any disclaimer, the term of this patent is extended or adjusted under 35 U.S.C. 154(b) by 956 days.

(21) Appl. No.: 13/403,944

(22) Filed: Feb. 23, 2012

(65) Prior Publication Data

US 2013/0062944 A1 Mar. 14, 2013

Related U.S. Application Data

(60) Provisional application No. 61/467,929, filed on Mar. 25, 2011, provisional application No. 61/508,012, filed on Jul. 14, 2011.

(51) Int. Cl.
| | |
|---|---|
| *G06F 1/26* | (2006.01) |
| *H02J 4/00* | (2006.01) |
| *H02J 3/28* | (2006.01) |
| *H02J 3/38* | (2006.01) |
| *H02J 3/32* | (2006.01) |
| *H02J 13/00* | (2006.01) |

(52) U.S. Cl.
CPC ... *H02J 4/00* (2013.01); *H02J 3/28* (2013.01); *H02J 3/382* (2013.01); *H02J 3/32* (2013.01); *H02J 13/0013* (2013.01); *Y02B 90/2607* (2013.01); *Y02E 40/72* (2013.01); *Y02E 60/722* (2013.01); *Y02E 70/30* (2013.01); *Y04S 10/123* (2013.01); *Y04S 10/14* (2013.01); *Y04S 40/12* (2013.01); *Y10T 307/391* (2015.04)

(58) Field of Classification Search
None
See application file for complete search history.

(56) References Cited

U.S. PATENT DOCUMENTS

| | | |
|---|---|---|
| 4,023,043 A | 5/1977 | Stevenson |
| 4,520,274 A | 5/1985 | Stants |
| 5,500,561 A | 3/1996 | Wilhelm |
| 5,816,491 A | 10/1998 | Berkeley |
| 5,930,773 A | 7/1999 | Crooks |
| 6,037,758 A | 3/2000 | Perez |
| 6,134,124 A | 10/2000 | Jungreis |
| 6,172,432 B1 | 1/2001 | Schnackenberg |
| 6,542,791 B1 | 4/2003 | Perez |
| 6,618,709 B1 | 9/2003 | Sneeringer |
| 6,728,646 B2 | 4/2004 | Howell |
| 6,785,592 B1 | 8/2004 | Smith |
| 6,889,122 B2 | 5/2005 | Perez |
| 6,900,556 B2 | 5/2005 | Provanzana |
| 6,902,837 B2 | 6/2005 | McCluskey |
| 7,060,379 B2 | 6/2006 | Speranza |
| 7,069,161 B2 | 6/2006 | Gristina |

(Continued)

*Primary Examiner* — Jared Fureman
*Assistant Examiner* — Aqeel Bukhari
(74) *Attorney, Agent, or Firm* — Richard C. Galati; Holland & Hart LLP

(57) ABSTRACT

A utility distribution control system and method for performing distribution control of energy within a utility service network including an energy distribution network in communication with a plurality of energy resources. The energy distribution network includes a plurality of energy storage and generation devices which receive energy from at least one of the energy resources of the plurality of resources and distribute energy, and a controller which controls the plurality of energy storage and generation devices, to distribute energy.

22 Claims, 4 Drawing Sheets

(56) References Cited

U.S. PATENT DOCUMENTS

| | | |
|---|---|---|
| 7,142,949 B2 | 11/2006 | Brewster |
| 7,894,946 B2 | 2/2011 | Kulyk |
| 8,024,077 B2 | 9/2011 | Torre |
| 2001/0043013 A1 | 11/2001 | Abe |
| 2003/0055677 A1 | 3/2003 | Brown |
| 2004/0024483 A1 | 2/2004 | Holcombe |
| 2004/0084965 A1 | 5/2004 | Welches |
| 2005/0043862 A1 | 2/2005 | Brickfield |
| 2005/0076149 A1* | 4/2005 | McKown et al. ............ 709/249 |
| 2007/0005192 A1 | 1/2007 | Schoettle |
| 2007/0043478 A1* | 2/2007 | Ehlers et al. ................ 700/276 |
| 2008/0167756 A1 | 7/2008 | Golden |
| 2008/0191675 A1 | 8/2008 | Besser |
| 2008/0281663 A1* | 11/2008 | Hakim et al. .................... 705/8 |
| 2009/0157529 A1 | 6/2009 | Ehlers |
| 2009/0254396 A1 | 10/2009 | Metcalfe |
| 2010/0017045 A1 | 1/2010 | Nesler |
| 2010/0283606 A1 | 11/2010 | Tsypin |
| 2010/0286937 A1 | 11/2010 | Hedley |
| 2010/0327800 A1 | 12/2010 | Reineccius |
| 2011/0046806 A1 | 2/2011 | Nagel |
| 2011/0071932 A1* | 3/2011 | Agassi et al. ................ 705/34 |

* cited by examiner

UTILITY DISTRIBUTION CONTROL SYSTEM

CROSS REFERENCE TO RELATED APPLICATIONS

This application claims priority and cross-reference to the following prior-filed patent applications and they are hereby incorporated by reference in their entirety: U.S. provisional patent application No. 61/467,929 filed Mar. 25, 2011 titled, "Systems and Methods for Demand Response, Load Management, and Dynamic Pricing"; and U.S. provisional patent application No. 61/508,012 filed Jul. 14, 2011 titled, "Networked Power Management Systems".

BACKGROUND

The present invention relates generally to utility services, and more specifically, to a method and system for performing distribution control (i.e., demand management) of utility service assets within a utility service network in the form of automated load curtailment, use of energy storage systems, use of renewable energy sources and local energy generation, for example.

Distribution of utility service assets is a major concern. There are several utility service congestion areas (i.e., load pockets) in many metropolitan areas. Congestion occurs when actual or schedule energy flow is restricted below desired levels either by the capacity along the transmission line or by operational restrictions enforced to protect security and reliability of the utility service network. Sometimes, load pockets change due to time and temperature. It is imperative that the existing and growing congestion problems be remedied because the current and projected effects of the congestion are severe. Due to the congestion issues, the utility service networks periodically experience equipment failures and system outages and/or overloads.

It is desirable to provide a method and system that provides distribution control of utility service assets using various energy resources to minimize congestion and maximize reliability.

SUMMARY

According to one embodiment of the present invention, a utility distribution control system is provided. The utility distribution control system includes an energy distribution network in communication with a plurality of energy resources and including a plurality of energy storage and generation devices which receive energy from at least one of the plurality of energy resources and distribute energy, and a controller which controls the plurality of energy storage and generation devices, to distribute energy.

A computer-implemented method for implementing utility distribution control of energy resources within a utility service network is also provided. The method includes the steps of providing energy from a plurality of energy resources. The energy from at least one of the plurality of resources is received and distributed remotely via a plurality of energy storage and generation devices. A controller controls the plurality of energy storage and generation devices.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 3:
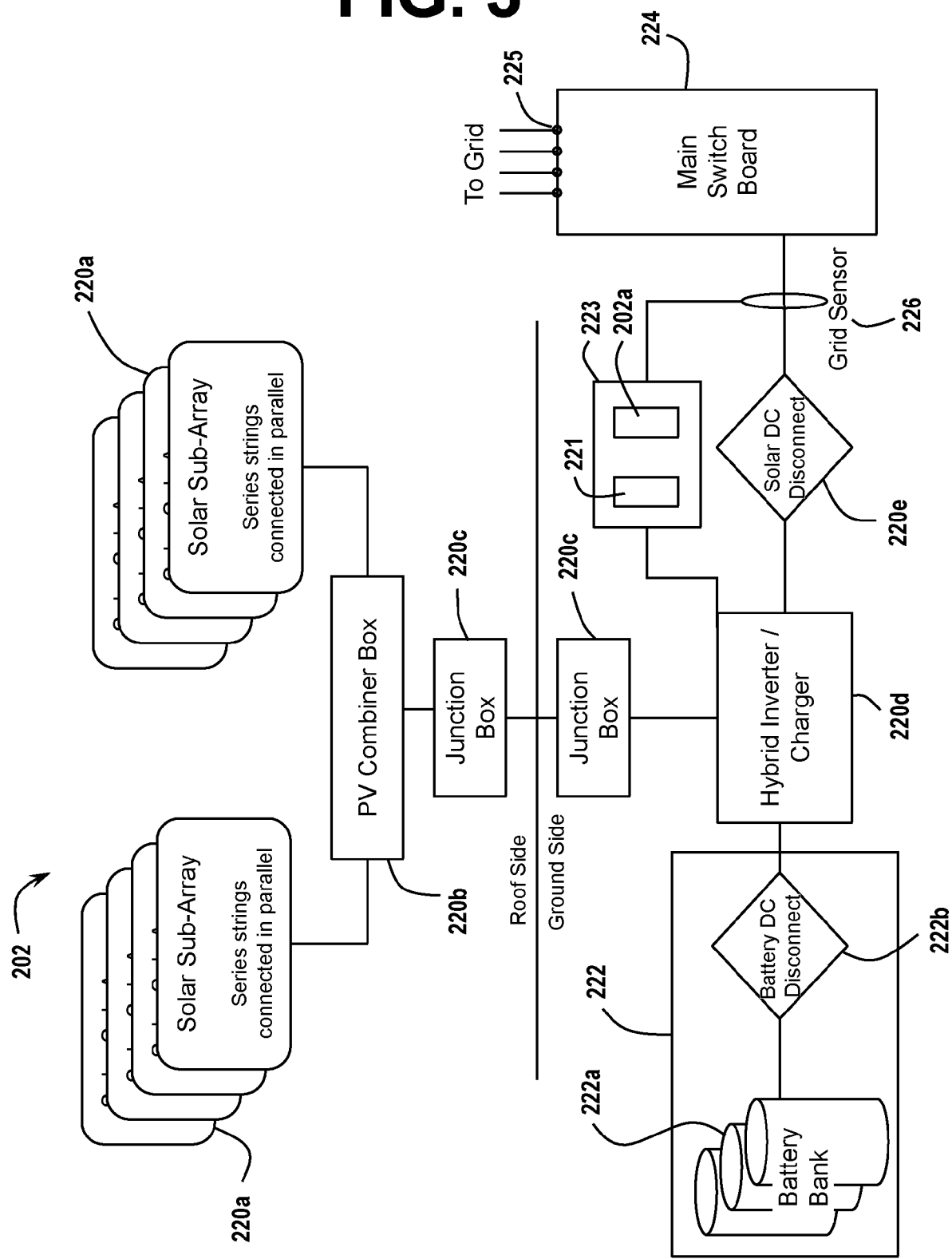
FIG. 3 is a diagram illustrating an energy storage and generation unit of the EDN shown in FIG. 2 that can be implemented within embodiments of the present invention.

Embodiments of the present invention provide a method and system for performing the method of and system providing distribution control of various energy sources and demand management of utility service assets based on reliability, capacity, load, margin, economics, and environmental factors. Embodiments of the present invention will be discussed in relation to electrical utility service components however the present invention is not limited hereto and may vary as necessary. According to an embodiment of the present invention, real-time tools providing situational awareness and machine-to-machine interfaces which leads to collaborative command and control of the utility service assets. The method and system of the present invention reacts to condition change and makes adjustments to minimize congestion and maximize reliability within a utility service network. The system has localized intelligence to make charge/no-charge and supply/no-supply decisions by employing a plurality of smart storage and generation units (SSGUs) (i.e., energy storage and generation devices) (as depicted in FIG. 3, for example). The SSGUs include built-in intelligence to react instantly to electrical congestion and mitigate the effects of contingencies such as equipment overloads and outages, and to promote self-healing in the utility service grid/network.

Figure 1:
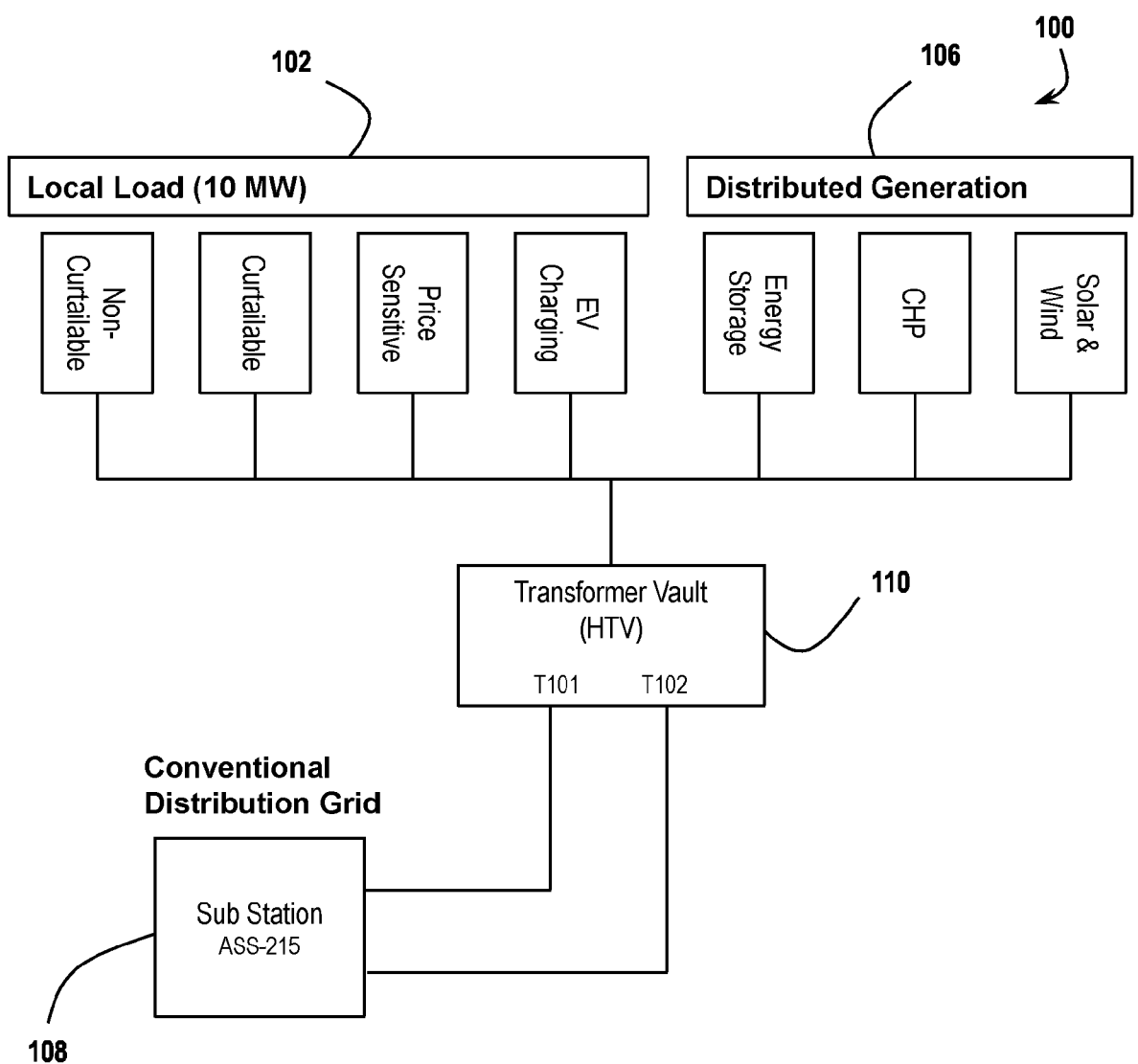
FIG. 1 is a diagram illustrating a utility distribution control system that may be implemented within embodiments of the present invention.

FIG. 1 is a diagram illustrating a utility distribution control system that may be implemented within embodiments of the present invention. As shown in FIG. 1, the utility distribution control system 100 includes a plurality of energy sources 102, 106, 108. These energy sources include local load 102 (i.e., approximately 10 MW), distributed generation sources 106 of energy, and utility service distribution grid/network 108. As further shown in FIG. 1, the local load 102 includes noncurtailable and curtailable loads, price sensitive loads such as residential areas, and electric vehicle (EV) charging, for example. The distributed generation sources 106 include energy storage locations, for example, solar and wind power, and combined heat and power (CHP) systems. According to an embodiment of the present invention, the sources 102, 106 and 108 are coupled together via a high-voltage transformer vault (HTV) 110, for example to perform distribution control of utility service assets within a utility service grid/network. According to an embodiment of the present invention, the control of the utility service assets is affected by external information such as pricing and economic data, historical data, risk assessment information (e.g., probable system failure and highest consequence failure predictions) and the status of wind/solar generation. According to an embodiment of the present invention, an energy delivery network (EDN) is provided within the utility distribution control system to assist in the distribution of the utility service assets by implementing demand management of the energy resources. The EDN will now be discussed below with reference to FIG. 2.

Figure 2:
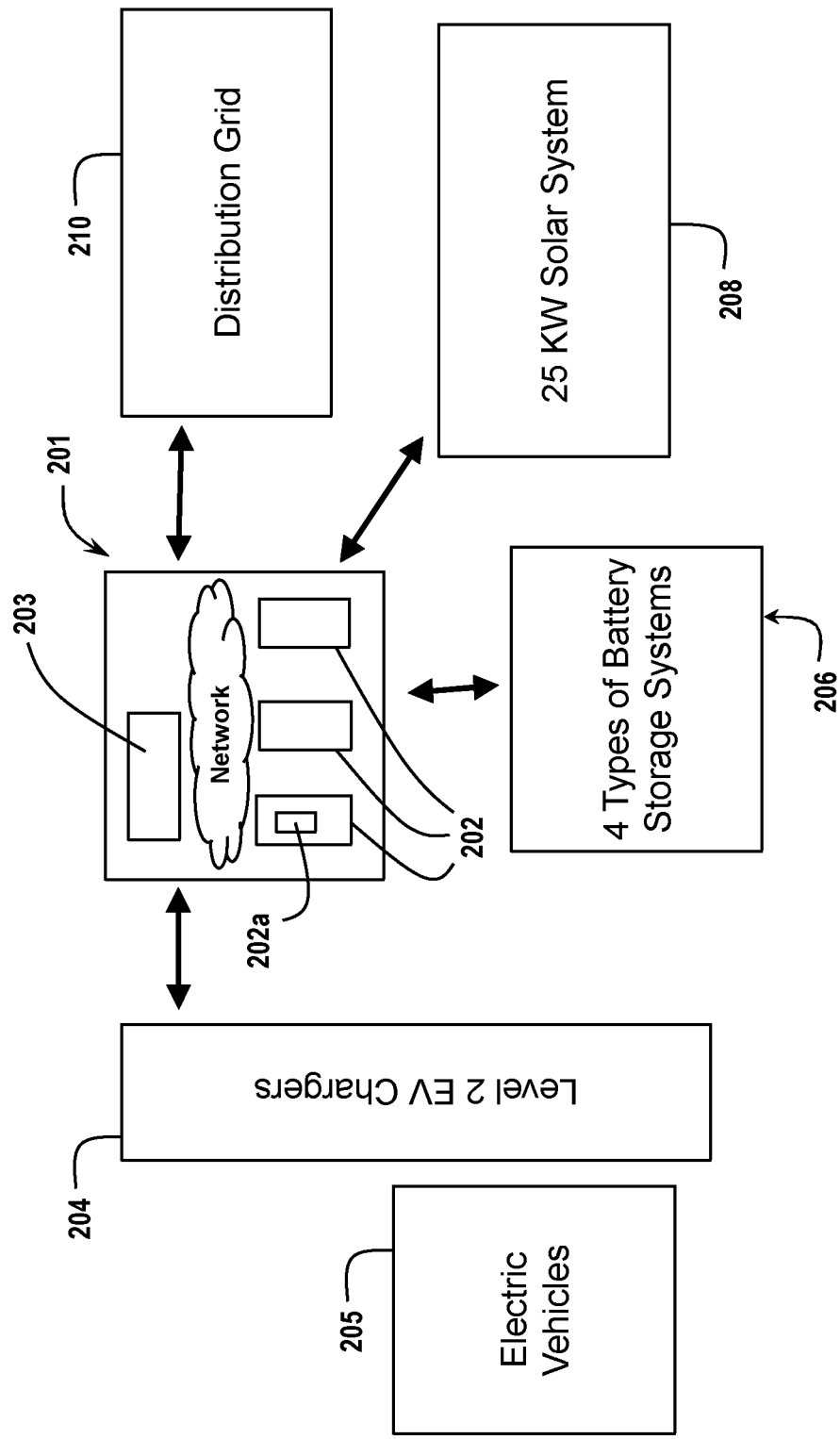
FIG. 2 is diagram illustrating an energy delivery network (EDN) of the utility distribution control system shown in FIG. 1 that can be implemented within embodiments of the present invention.

FIG. 2 is diagram illustrating an EDN of the utility distribution control system shown in FIG. 1 that can be implemented within embodiments of the present invention. As shown in FIG. 2, an EDN 200 is provided. The EDN 200 includes a control system 201 in communication with a plurality of energy resources including plurality of energy charging devices 204 for EVs 205, a plurality of battery storage systems 206, a plurality of solar systems 208 and at least one utility service distribution grid/network 210. According to an embodiment of the present invention, the EDN 200 harmonizes all energy sources across the distribution grid/network 210 and performs distribution in real-time. The EDN 200 optimizes renewable energy usage and enables recharging of EVs 205 via the energy charging devices 204 in areas of electrical congestion and enables peak shaving across the system 100. According to an embodiment of the present invention, by sensing the availability of renewable energy, the EDN 200 may charge energy storage devices or flow renewable energy directly to discretionary and price sensitive loads (e.g., residential areas) during periods of high renewable energy availability, thereby alleviating electrical congestion during periods of peak demands. According to an embodiment of the present invention, the control system 201 includes a plurality of energy storage and generation devices 202 in communication with at least one controller 203, to facilitate the energy distribution. According to an embodiment of the present invention, the energy storage and generation devices 202 communicate with each other, and the controller 203 via a network that provides cellular or wireless communication, for example. The controller 203 may be located at a control center of a utility service network, for example. Additional details regarding the energy storage and generation devices will now be described below with reference to FIG. 3.

FIG. 3 is a diagram illustrating an energy storage and generation device of the EDN shown in FIG. 2 that can be implemented within embodiments of the present invention. According to an embodiment of the present invention, the EDN 200 includes a plurality of energy storage and generation devices 202. The energy storage and generation devices 201 may perform independently or in combination as a part of a netted system. These energy storage and generation devices 202 are coupled with distributed generation to augment normal utility service grid/network power. Further, any storage technology and/or generation medium may plug into this distributed energy network.

Each energy storage and generation device 202 may include a remote controller 202a that communicates with the controller 203 in real-time. According to an embodiment of the present invention, each energy storage and generation device 202 may provide energy ranging from approximately 100 kilowatts (KW) to approximately 1 megawatt (MW) however the present invention is not limited hereto, and may vary as necessary.

According to an embodiment of the present invention, the energy storage and generation devices 202 may communicate with each other and with the controller 203. Further, each device 202 performs remote monitoring, to determine heath state and charge/discharge state thereof. However, the controller 203 may override a specified device 202 in order to alleviate system-wide peak load or congestion when necessary.

Each device 202 includes solar receiving element(s) 220a-220e for distributing solar electric power, known as photovoltaic (PV) technology. These elements include for example, solar sub-arrays 220a, PV combiner boxes 220b, a junction box 220c, a PV inverter 220d and a solar AC disconnect 220e however, the present invention is not limited hereto and may vary as needed. Further, each device 202 includes a data receiver/transmitter 221, remote controller 202a, a power supply unit 222 including a battery bank 222a and a battery DC disconnect 222b, a computing unit 223, a main switch board 224 and input port(s) 225 for connection to the utility service grid/network 210, for example (as shown in FIG. 2). As shown in FIG. 3, according to one embodiment of the present invention, the data receiver/transmitter 221, remote controller 202a and the computing unit 223 are combined as a single device. However, according to alternative embodiments of the present invention, these devices 202a, 221 and 223 may be provided as separate units within the device 202. Each device 202 further includes one or more sensors 226 to detect the health state of the utility service grid/network, to perform real-time demands and for shifting loads.

Further, according to an embodiment of the present invention, the controller 203 (as depicted in FIG. 2) performs control of each device 202 to control clustering or signal interferences between devices 202 when necessary.

According to another embodiment of the present invention, the EDN 200 is a rule-based decision tool which monitors remote energy sources including but not limited to wind turbine generators and other energy sources coming to the distribution system through the transmission system. This enables the system 100 to determine when generation plants such as coal fire plants are running at their most efficient, hence are performing in the cleanest mode of operation. The system 100 enables smart carbon arbitrage at local, regional and national levels. The system 100 enables load shifting by providing end to end visibility and machine to machine alerts and machine to consumer alerts for discretionary energy use. These alerts may come in the form of price signals, carbon credit information, etc. The system therefore facilitates maximizing load shifting and green energy usage by enabling consumers and customers to make informed decisions on discretionary energy use such as EV charging or pre-cooling buildings etc. due to the desirability of using electricity at that time. A price or other signal (carbon credit etc.) may be sent machine to machine to consumer systems. These may include the EV charging stations, EVs or communication devices such as computers, cellular phones, buildings, etc. to stimulate load shifting. For example, if a mobile user, such as an EV is in a high electrical congestion area, the system may elect not to offer a full price incentive to that consumer. It may only offer a partial price or carbon credit incentive to that consumer. It may provide information regarding locations that is a lower level of electrical congestion where the consumer can take the EV to receive full credit. The rule based system 100 may also monitor perturbations to the transmission system and provides an early warning alert to broad system outages. This alert signal is sent directly to safety related facility equipment to allow for safe and orderly shut down.

Figure 4:
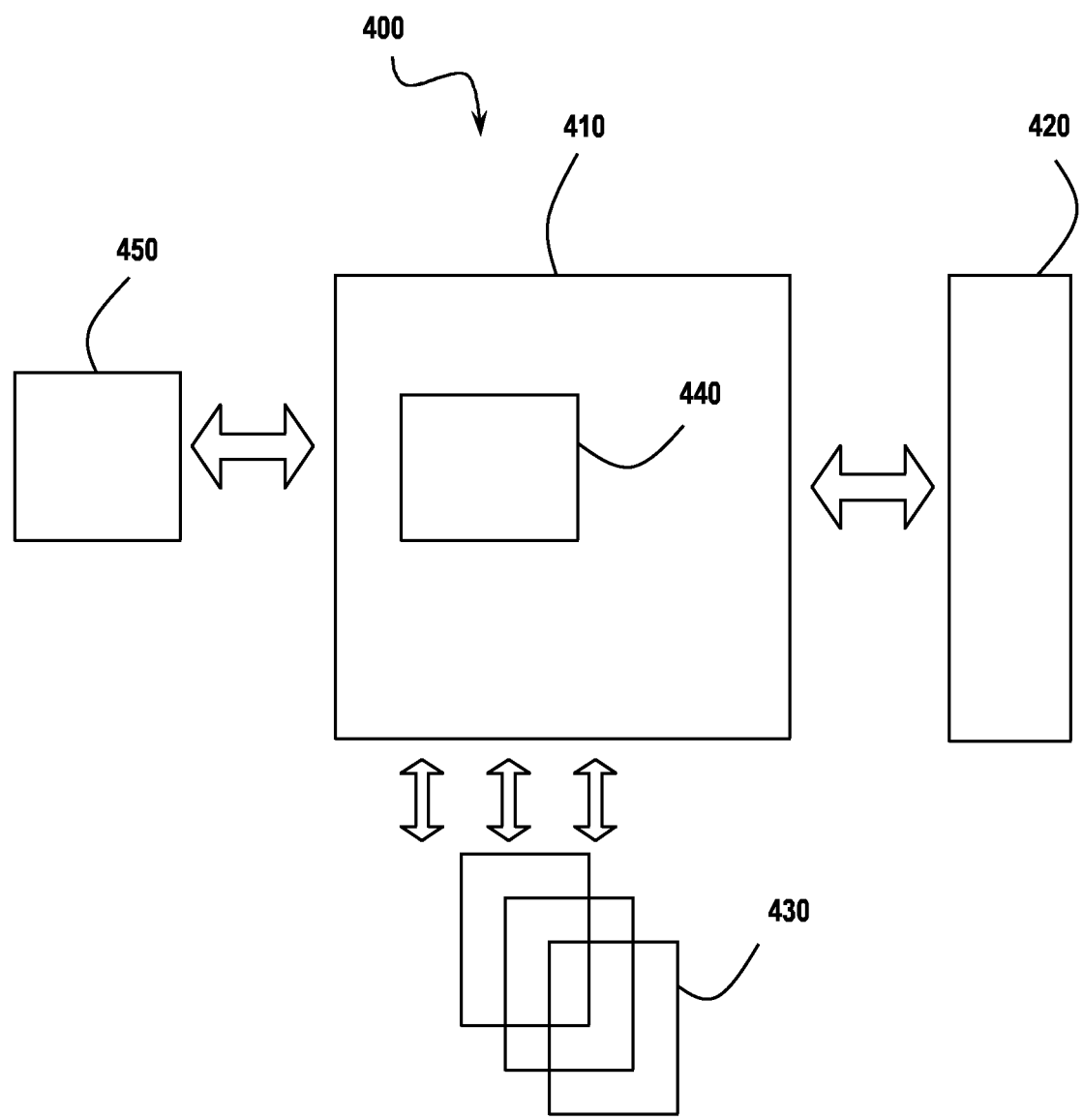
FIG. 4 is block diagram illustrating a system implementing the controller of the EDN as shown in FIG. 2 that can be implemented within embodiments of the present invention.

The controller 203 may be implemented within a system as shown in FIG. 4. FIG. 4 is block diagram illustrating a system that can be implemented within embodiments of the present invention. According to an embodiment of the present invention, a system 400 includes a processing unit 410 and a graphical user interface 420 as shown in FIG. 4. The system 400 may be a general purpose computing device or other suitable computing device for the purpose set forth herein. The graphical user interface 420 is configured to receive and transmit data to and from a user and interface with the processing unit 410. According to an embodiment of the present invention, the processing unit 410 obtains utility service network information from a plurality of external sources 430 and stores the obtained information in at least one database 440. According to an embodiment of the present invention, the network information comprises at least one of feeder information, transformer information, manhole information, service box information and system outage and overload information. The processing unit 410 integrally combines the network information obtained from each external source 430.

The network information includes local energy assets usage, equipment and system health and status information. According to an embodiment of the present invention, the processing unit 410 dynamically updates the utility service network information.

According to an embodiment of the present invention, the processing unit 410 also interfaces with a machine learning model 450 to obtain system analysis information of the utility service components, additional details regarding the machine learning model will be discussed below. The utility service network information is transmitted via the processing unit 410 to the graphical user interface 420 to be displayed to the user, upon request.

The machine learning model 450 (as depicted in FIG. 1) which incorporates machine learning and pattern recognition algorithms to assist in analysis of the data such as that described in co-pending, commonly assigned U.S. patent application Ser. No. 12/178,553 entitled System and Method for Grading Electricity Distribution Network Feeders Susceptible to Impending Failure filed on Jul. 23, 2008 by Arthur Kressner, Mark Mastrocinque, Matthew Koenig and John Johnson which is incorporated by reference in its entirety. The processing unit 410 of the system 400 is configured to obtain the risk assessment information from the machine learning module 450.

Embodiments of the present invention provide a method and system for providing distribution control of utility service assets of a utility service network in a single integrated way. Therefore, the present invention provides the advantages using various energy resources including renewable energy to help minimize electrical congestion and reduce loads during peak demands, and therefore reduce system outages and overloads within a utility service network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to provide grid/network information for a utility service network in an automated and integrated way.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A utility distribution control system comprising:
 a plurality of energy resources including a utility service network;
 an energy distribution network in communication with the plurality of energy resources, the energy distribution network comprising:
  a plurality of energy storage and generation devices which are configured to receive energy from at least one of the plurality of energy resources and distribute energy, each of the plurality of energy storage and generation devices comprising at least one sensor configured to detect a state of the utility service network and to perform real-time demands for energy loads, and
  a controller which controls the plurality of energy storage and generation devices to distribute energy, wherein the plurality of energy storage and generation devices perform independently;
 wherein the controller is positioned within a central control location of the utility service network.

2. The utility distribution control system of claim 1, wherein the plurality of energy resources comprises at least one of energy charging devices, battery storage systems, and solar and wind resources.

3. The utility distribution control system of claim 1, wherein the energy distribution network performs distribution in real-time.

4. The utility distribution control system of claim 2, wherein, the plurality of energy storage and generation devices communicate with each other and the controller via a communications network.

5. The utility distribution control system of claim 4, wherein the communications network is one of cellular or wireless communication.

6. The utility distribution control system of claim 5, wherein the plurality of energy storage and generation devices perform in combination.

7. The utility distribution control system of claim 1, wherein the plurality of energy storage and generation devices are coupled with the utility service network.

8. The utility distribution control system of claim 1, wherein each of the plurality of energy storage and generation device includes a remote controller which communicates with the controller in real-time and which performs remote monitoring to determine a health state and charge/discharge state of each respective energy storage and generation device.

9. The utility distribution control system of claim 8, wherein each of the plurality of energy storage and generation device provides energy ranging from approximately 100 kilowatts (KW) to approximately 1 megawatt (MW).

10. The utility distribution control system of claim 8, wherein each of the plurality of energy storage and generation devices comprises:

solar receiving elements to receive and distribute solar energy;
 a data receiver/transmitter;
 a power supply unit;
 a main computing unit which controls the respective energy storage and generation device;
 an input port to connect with the utility service network.

11. The utility distribution control system of claim 1, wherein the energy distribution network transmits alerts via at least one of the plurality of energy storage and generation devices and the controller to users for discretionary energy use.

12. The utility distribution control system of claim 1, wherein the plurality of energy storage and generation devices perform distribution based on external information including at least one of pricing and economic data, peak shaving requirements, historical data, risk assessment, and a status of wind and solar generation.

13. A tangible computer-readable medium including computer-executable instructions stored thereon for performing a method for implementing utility distribution control of energy resources within a utility service network, the method comprising:
 providing energy from a plurality of energy resources including a utility service network;
 receiving energy from at least one of the plurality of energy resources and distributing energy remotely via a plurality of energy storage and generation devices, each of the plurality of energy storage and generation devices comprising at least one sensor configured to detect a state of the utility service network and to perform real-time demands for energy loads; and
 controlling, via a controller positioned within a central control location of the utility service network, the plurality of energy storage and generation devices, wherein the plurality of energy storage and generation devices perform independently.

14. The tangible computer-readable medium of claim 13, wherein the plurality of energy resources comprises at least one of energy charging devices, battery storage systems, and solar and wind resources.

15. The tangible computer-readable medium of claim 13, the method further comprising:
 evaluating a status of the utility service network, and distributing energy via at least one of the plurality of energy storage and generation devices, from another of the energy resources of the plurality of energy resources based on the status.

16. The tangible computer-readable medium of claim 15, wherein the plurality of energy storage and generation devices communicate with each other and the controller via a network.

17. The tangible computer-readable medium of claim 16, wherein the network is one of cellular or wireless communication.

18. The tangible computer-readable medium of claim 16, wherein the plurality of energy storage and generation devices perform in combination.

19. The tangible computer-readable medium of claim 16, wherein the plurality of energy storage and generation devices are coupled with the utility service network.

20. The tangible computer-readable medium of claim 16, the method further comprising:
 monitoring of each of the plurality of energy storage and generation device, via a remote controller thereof, which communicates with the controller in real-time, and determines a health state and charge/discharge state of each respective energy storage and generation device.

21. The tangible computer-readable medium of claim 20, wherein each of the plurality of energy storage and generation device provides energy ranging from approximately 100 kilowatts (KW) to approximately 1 megawatt (MW).

22. The tangible computer-readable medium of claim 20, the method further comprising:
- receiving and distributing solar energy via the plurality of energy storage and generation devices;
- receiving and transmitting data between the plurality of energy storage and generation devices and the utility service network; and
- detecting and analyzing, via the plurality of energy storage and generation devices, a state of the utility service network, and performing distribution of energy in real-time.

\* \* \* \* \*